(12) United States Patent
Ahn et al.

(10) Patent No.: US 11,194,020 B2
(45) Date of Patent: Dec. 7, 2021

(54) LIDAR-INTEGRATED LAMP DEVICE FOR VEHICLE

(71) Applicants: Hyundai Motor Company, Seoul (KR); Kia Motors Corporation, Seoul (KR)

(72) Inventors: Byoung Suk Ahn, Gwacheon-si (KR); Jung Wook Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 305 days.

(21) Appl. No.: 16/588,389

(22) Filed: Sep. 30, 2019

(65) Prior Publication Data

US 2020/0341121 A1 Oct. 29, 2020

(30) Foreign Application Priority Data

Apr. 25, 2019 (KR) .................... 10-2019-0048506

(51) Int. Cl.
*G01S 7/481* (2006.01)
*F21S 41/20* (2018.01)
*F21S 41/176* (2018.01)
*F21S 41/16* (2018.01)
*F21S 41/32* (2018.01)
*F21S 45/47* (2018.01)
*G01S 17/08* (2006.01)
*F21W 102/13* (2018.01)
*F21S 41/365* (2018.01)
*G01S 17/931* (2020.01)
*G01S 17/86* (2020.01)
*G01S 13/931* (2020.01)

(52) U.S. Cl.
CPC ............. *G01S 7/4814* (2013.01); *F21S 41/16* (2018.01); *F21S 41/176* (2018.01); *F21S 41/285* (2018.01); *F21S 41/32* (2018.01); *F21S 45/47* (2018.01); *G01S 17/08* (2013.01); *F21S 41/365* (2018.01); *F21W 2102/13* (2018.01); *G01S 17/86* (2020.01); *G01S 17/931* (2020.01); *G01S 2013/93277* (2020.01)

(58) Field of Classification Search
CPC ............................................. G01S 2013/93277
See application file for complete search history.

(56) References Cited

U.S. PATENT DOCUMENTS 9,285,477 B1 3/2016 Smith et al.
2020/0339030 A1* 10/2020 Ahn ................ F21S 41/16
2020/0341120 A1* 10/2020 Ahn ................ F21S 41/365

FOREIGN PATENT DOCUMENTS

DE 102018202363 A1 * 8/2019 ............ F21S 43/26
KR 10-2009-0096994 A 9/2009
WO WO-2016062872 A1 * 4/2016 ........... G01S 17/931

* cited by examiner

*Primary Examiner* — Alexander K Garlen
*Assistant Examiner* — Colin J Cattanach
(74) *Attorney, Agent, or Firm* — Morgan, Lewis & Bockius LLP

(57) ABSTRACT

Disclosed is a lidar-integrated lamp device for a vehicle in which an application position of a headlamp and an application position of a lidar are the same to reduce a layout and cost according to a reduction in the number of components through a component sharing combination.

17 Claims, 8 Drawing Sheets

LIDAR-INTEGRATED LAMP DEVICE FOR VEHICLE

CROSS REFERENCE TO RELATED APPLICATION

The present application claims priority to Korean Patent Application No. 10-2019-0048506, filed Apr. 25, 2019, the entire contents of which is incorporated herein for all purposes by this reference.

BACKGROUND OF THE PRESENT INVENTION

Field of the Present Invention

The present invention relates to a laser radar, light detection and ranging (lidar)-integrated lamp device for a vehicle in which functions of a headlamp and a lidar function are realized in one space.

Description of Related Art

Generally, vehicles have a lighting system used to allow an object in a running direction to be easily visible and allow a driver of another vehicle or a passenger of a road to easily recognize a running state of a host vehicle. A headlamp, which is also referred to as a headlight, is an illuminating lamp that illuminates the road ahead of the vehicle.

In recent years, a lidar for realizing an autonomous vehicle has been provided. Lidar is configured to detect a distance between a vehicle and a target by irradiating a laser beam and measuring a time for light to be transmitted and received from a sensor to a target.

Such a lidar is provided at a position similar to that of a headlamp in a vehicle, and here, since the lidar and the headlamp are mounted at different positions, installation spaces for the headlamp and the lidar need to be secured, respectively. Furthermore, since the headlamp and the lidar are respectively mounted, the installation spaces and components are increased and if optimal installation positions of the headlamp and the lidar are the same, a position of any one thereof may be changed even if any one of the functions thereof is sacrificed.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a lidar-integrated lamp device for a vehicle in which a headlamp and a lidar are applied and configured at the same position to thus reduce a layout.

According to an exemplary embodiment of the present invention, a lidar-integrated lamp device for a vehicle may include: a light source for a beam pattern and a light source for lidar sensing disposed to face each other and configured to light for a beam pattern and light for lidar sensing in a direction opposite to each other; a reflective unit provided between the light source for a beam pattern and the light source for lidar sensing and configured to change movement paths of the light for a beam pattern and the light for lidar sensing incident in mutually different directions such that the light for a beam pattern and the light for lidar sensing are moved in one and the other direction mutually opposite to each other, respectively; a first reflective mirror provided on one side of the reflective unit to allow the light for lidar sensing reflected from the reflective unit to be incident thereon and configured to allow the light for lidar sensing to exit to the outside of a vehicle; and a second reflective mirror provided on the other side of the reflective unit to allow light for a beam pattern reflected from the reflective unit to be incident thereon and configured to reflect the light for a beam pattern such that the light for a beam pattern to be changed into recognizable light and allow the light for a beam pattern to exit to the outside of the vehicle.

The lidar-integrated lamp device may further include: a light receiving unit configured to receive light for lidar sensing returned upon being reflected from an object after exiting to the outside of the vehicle and to convert the received light into an electrical signal.

The reflective unit may include a reflective mirror which is configured to be rotated 360 degrees about a rotation axis of the reflective mirror to be changed in a rotation angle of the reflective mirror when a driving signal is applied to the reflective mirror, and an irradiation angle of the light for a beam pattern and an irradiation angle of the light for lidar sensing may be changed according to rotation angles of the reflective mirror.

The lidar-integrated lamp device may further include: a controller configured to control ON/OFF of the reflective mirror, the light source for a beam pattern, and the light source for lidar sensing, wherein a lamp irradiation angle region and a lidar irradiation angle region based on the rotation angles of the reflective mirror may be set in advance in the controller, and the controller may turn on the light source for a beam pattern when the rotation angle of the reflective mirror corresponds to the lamp irradiation angle region, and may turn on the light source for lidar sensing when the rotation angle of the reflective mirror corresponds to the lidar irradiation angle region.

When a dark portion to which the light for a beam pattern is not irradiated is generated in the lamp irradiation angle region, the controller may set a dark portion generation angle corresponding to the dark portion and turn off the light source for a beam pattern at the dark portion generation angle.

The reflective mirror of the reflective unit may be tilted to cause the light for a beam pattern and the light for lidar sensing to be moved upward or downward, and the first reflective mirror and the second reflective mirror may be spaced from each other upwards and downwards with respect to the reflective unit according to a tilting direction of the reflective mirror.

A rotation axis of the reflective mirror may be tilted at an installation angle in a virtual vertical line passing through the reflective mirror, the first reflective mirror may be provided on one side of the reflective unit, and the second reflective mirror may be provided on the other side of the reflective unit, whereby the light for a beam pattern is reflected from the reflective mirror and moved to one side to exit to the outside of the vehicle by the second reflective mirror, and the light for lidar sensing is reflected from the reflective mirror, moved to the other side of the reflective mirror, and changed in a movement direction to one side by the first reflective mirror to exit to the outside of the vehicle.

The first reflective mirror may be spaced from the reflective mirror at a right angle to the rotation axis of the reflective mirror and may be tilted by ½ of the installation angle with respect a virtual horizontal line passing through the first reflective mirror.

The second reflective mirror may be spaced from the reflective mirror at a right angle to the rotation axis of the reflective mirror and may be tilted by ½ of the installation angle with respect a virtual horizontal line passing through the second reflective mirror.

The lidar-integrated lamp device may further include a first optical system allowing the light for lidar sensing reflected from the first reflective mirror to be diffused and exit to the outside of the vehicle.

The first optical system may include: a first diffusion lens diffusing the light for lidar moved after being reflected from the first reflective mirror in the horizontal direction and a second diffusion lens diffusing the light for lidar sensing, diffused by the first diffusion lens in the horizontal direction thereof, in a vertical direction thereof.

The lidar-integrated lamp device may further include a second optical system allowing the light for a beam pattern changed into recognizable light by the second reflective mirror to be incident and allowing the light for a beam pattern to be projected to the outside of the vehicle.

A diffusion unit configured to diffuse the light for a beam pattern may be provided between the reflective unit and the second reflective mirror.

A plurality of opaque partitions extending in a straight line may be spaced from each other on an end surface of the second reflective mirror.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
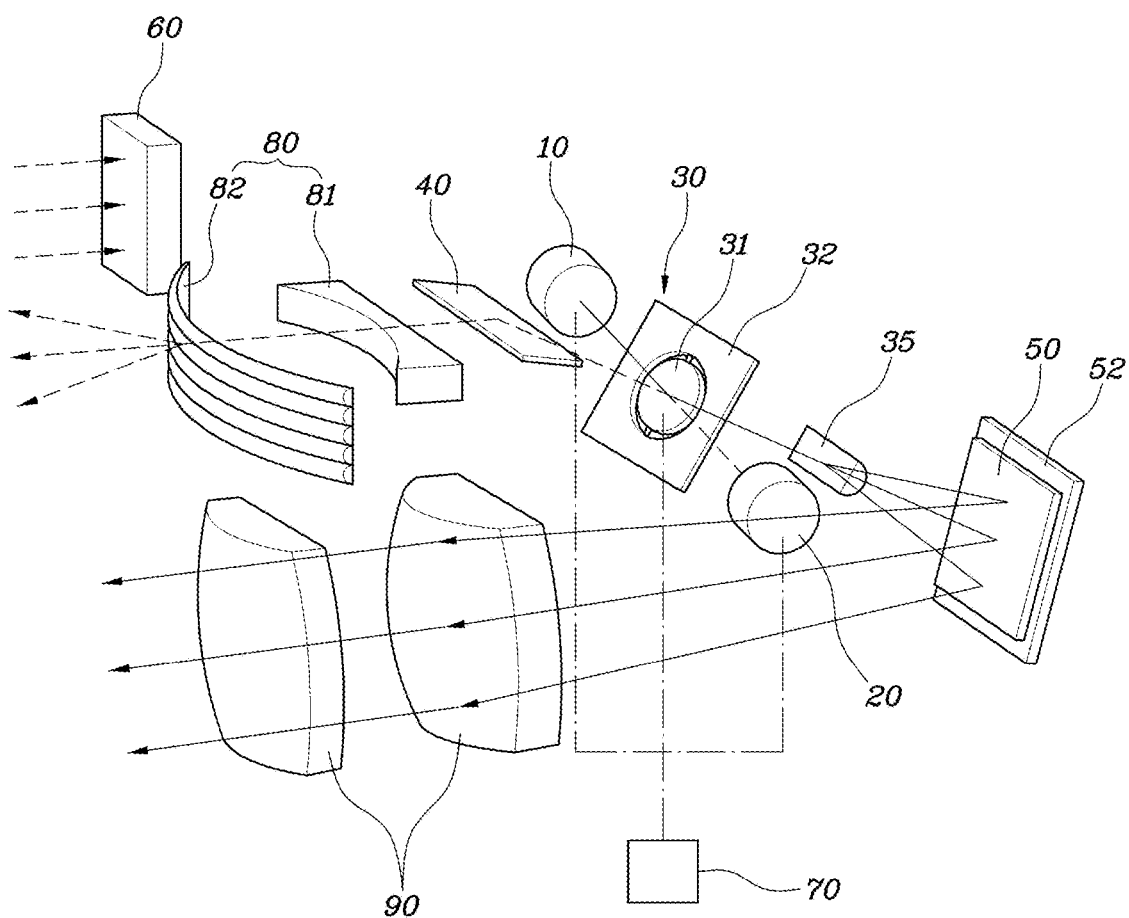
FIG. 1 is a view exemplarily illustrating a lidar-integrated lamp device for a vehicle according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a lidar-integrated lamp device for a vehicle according to an exemplary embodiment of the present invention will be described with reference to the accompanying drawings.

Figure 2:
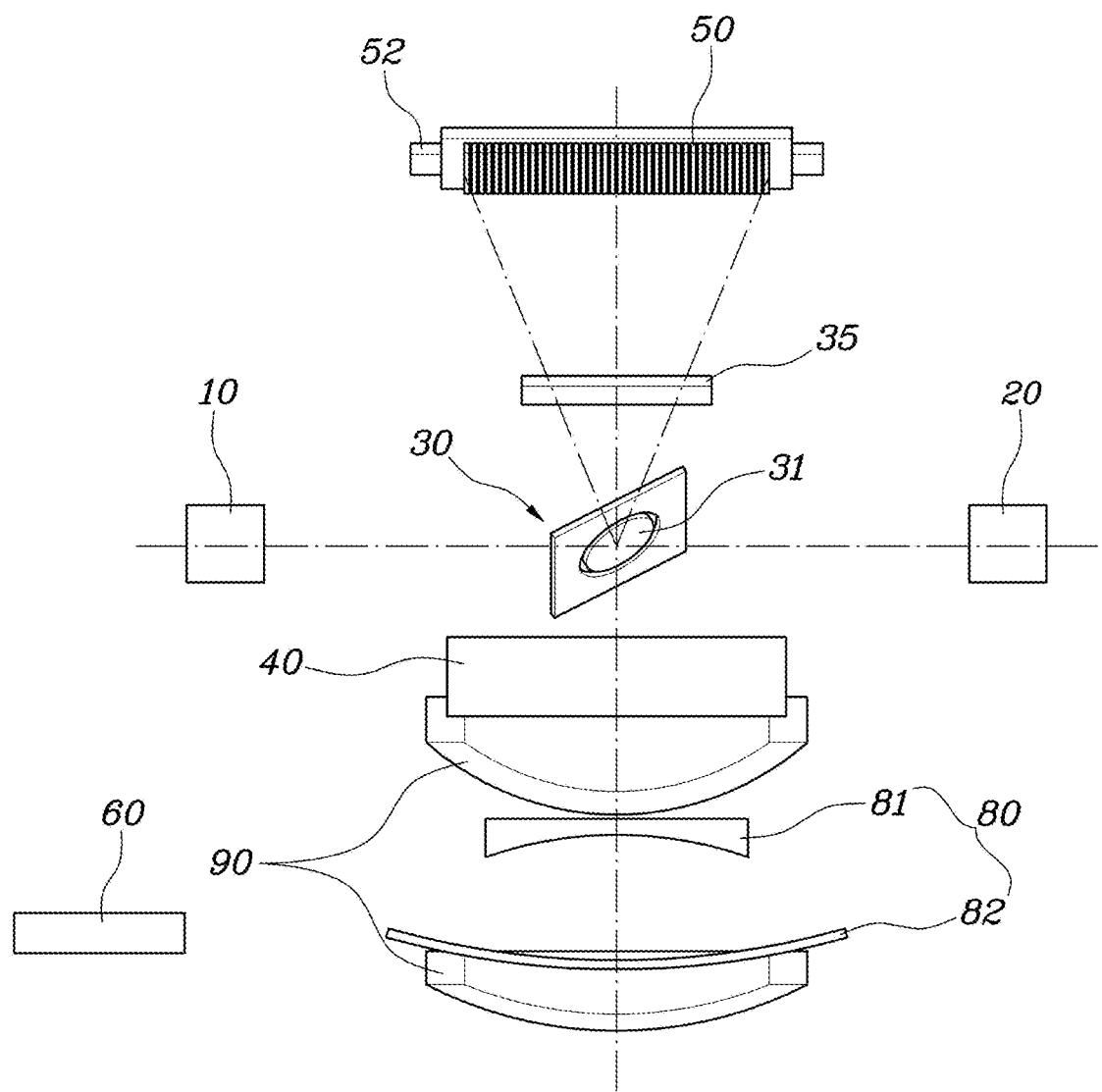
FIG. 2, FIG. 3 and FIG. 4 are views illustrating the lidar-integrated lamp device for a vehicle illustrated in FIG. 1.
Figure 3:
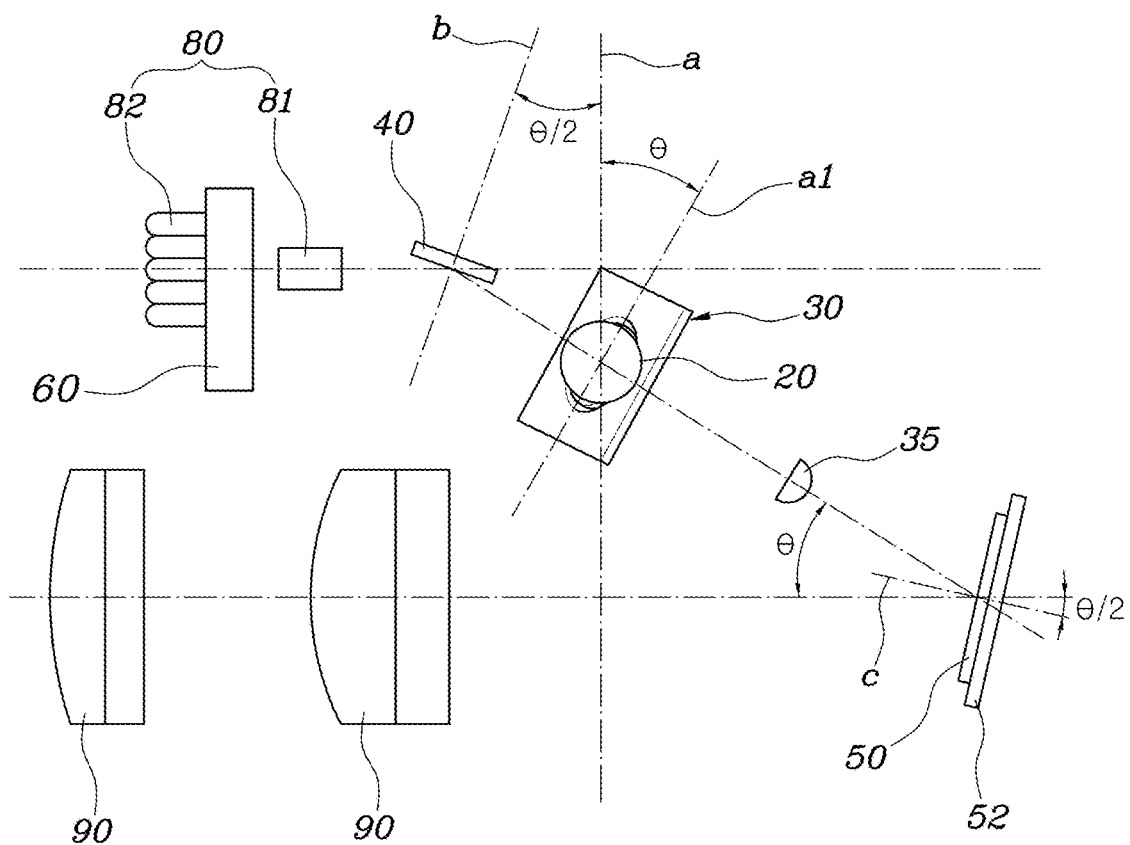
Figure 4:
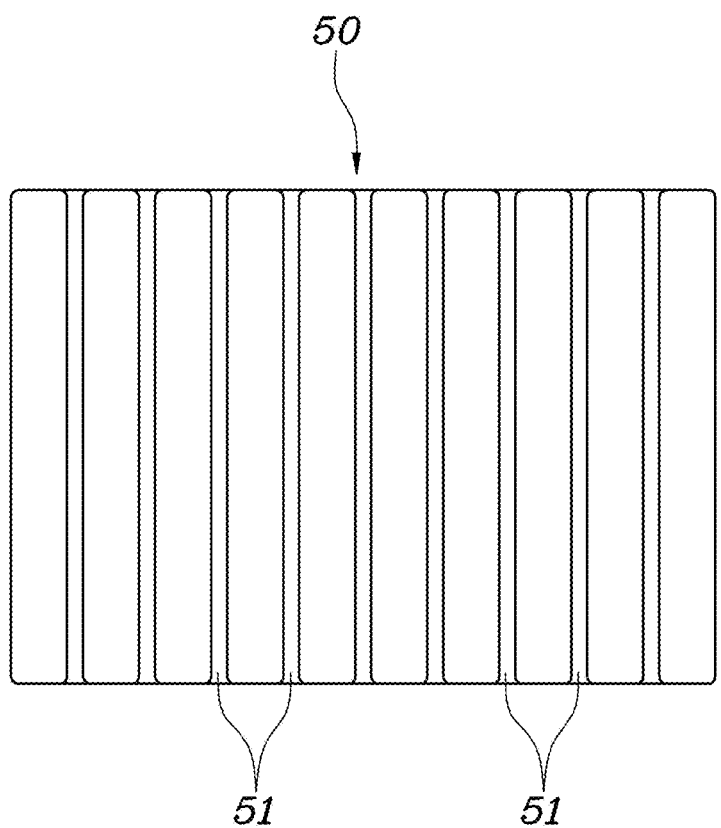
Figure 6:
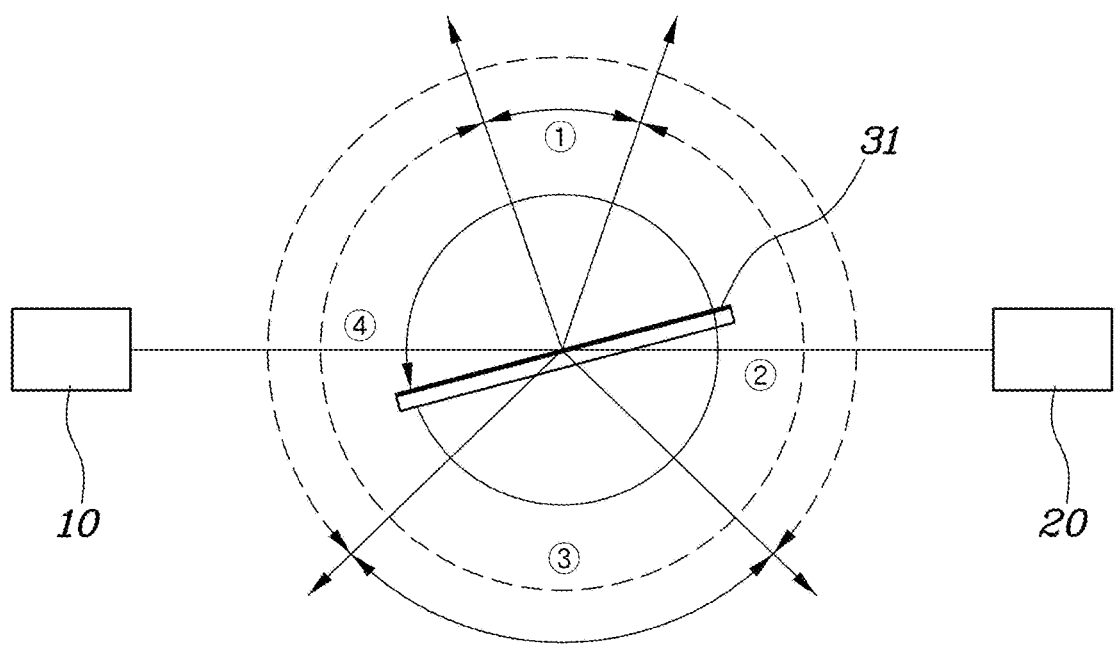
Figure 7:
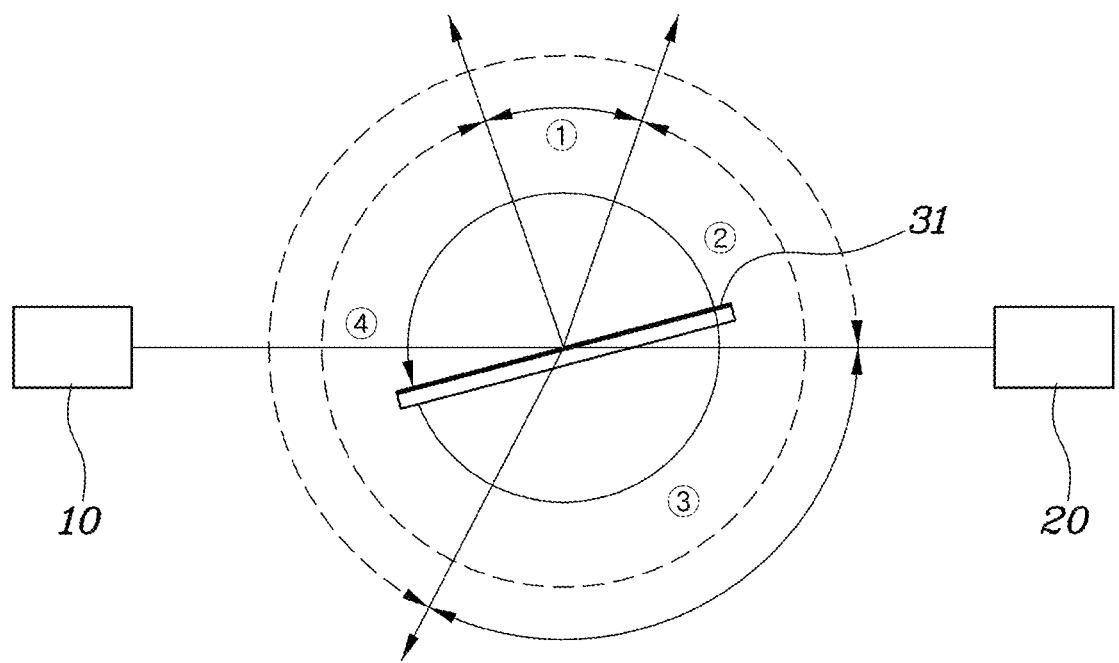
Figure 8:
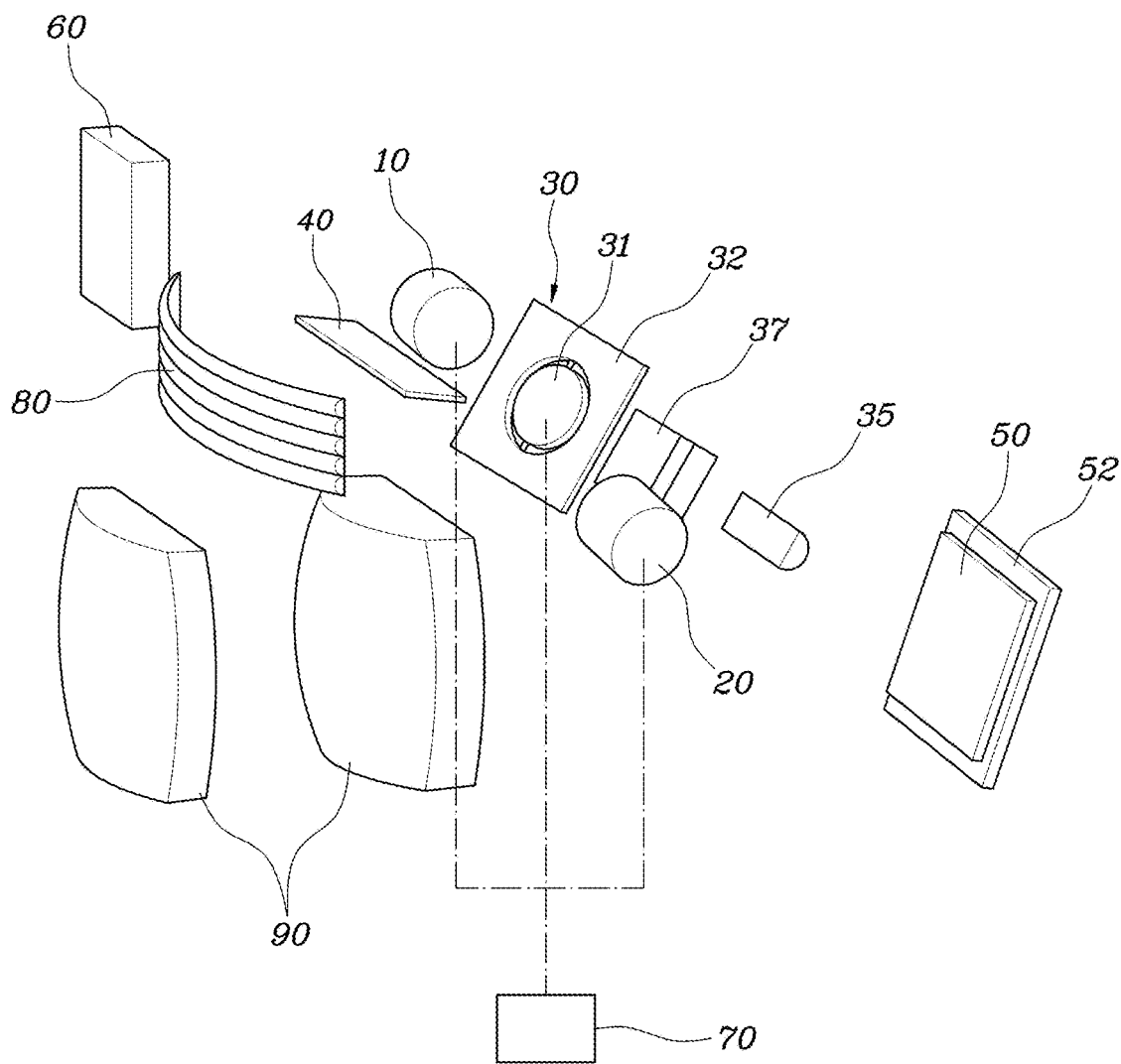
FIG. 8 and FIG. 9 are views illustrating a lidar-integrated lamp device for a vehicle according to various exemplary embodiments of the present invention.
Figure 9:
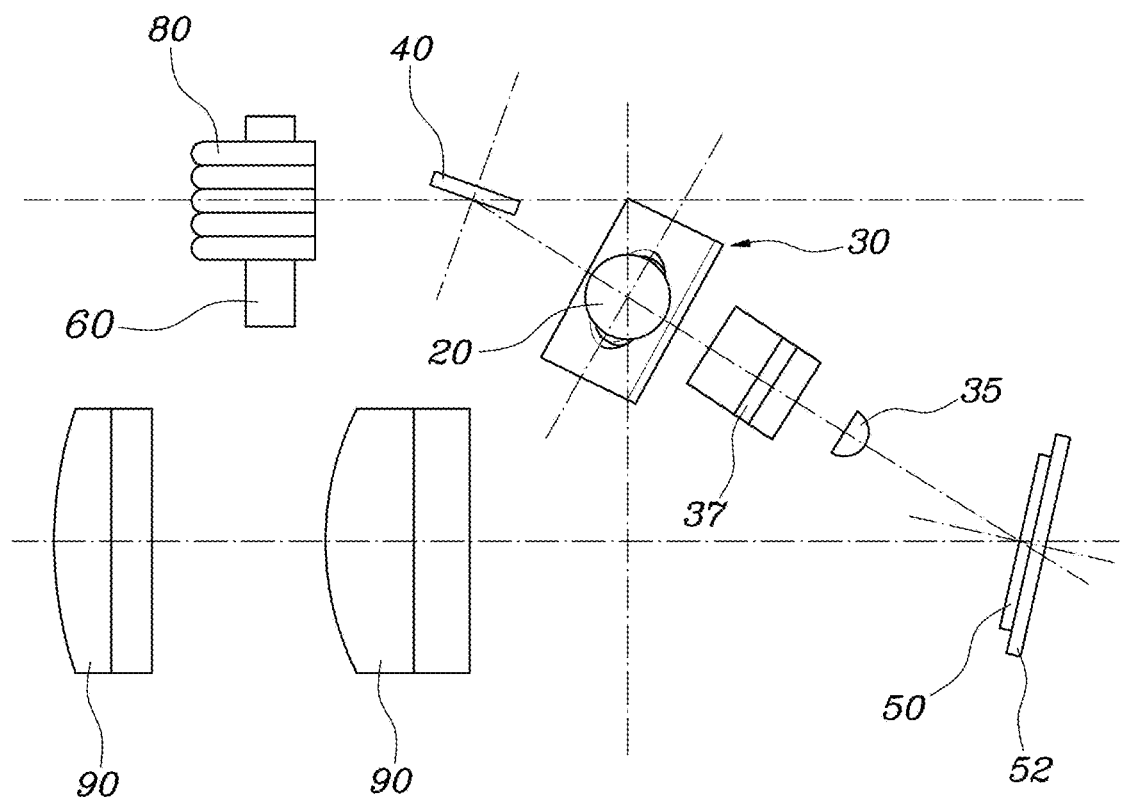

FIG. 1 is a view exemplarily illustrating a lidar-integrated lamp device for a vehicle according to an exemplary embodiment of the present invention, FIG. 2, FIG. 3 and FIG. 4 are views illustrating the lidar-integrated lamp device for a vehicle illustrated in FIG. 1, FIG. 5, FIG. 6 and FIG. 7 are views illustrating controlling of a light source of a lidar-integrated lamp device for a vehicle according to an exemplary embodiment of the present invention, and FIG. 8 and FIG. 9 are views illustrating a lidar-integrated lamp device for a vehicle according to various exemplary embodiments of the present invention.

Referring to FIGS. 1 through 3, the lidar-integrated lamp device according to an exemplary embodiment of the present invention includes: a light source 10 for a beam pattern and a light source 20 for lidar sensing mounted to face each other and configured to light for a beam pattern and light for lidar sensing in a direction opposite to each other; a reflective unit 30 provided between the light source 10 for a beam pattern and the light source 20 for lidar sensing and configured to change movement paths of the light for a beam pattern and the light for lidar sensing incident in mutually different directions such that the light for a beam pattern and the light for lidar sensing are moved in one or the other direction mutually opposite to each other, respectively; a first reflective mirror 40 provided on one side of the reflective unit 30 to allow the light for lidar sensing reflected from the reflective unit 30 to be incident thereon and configured to allow the light for lidar sensing to exit to the outside of a vehicle; and a second reflective mirror 50 provided on the other side of the reflective unit 30 to allow light for a beam pattern reflected from the reflective unit 30 to be incident thereon and configured to reflect the light for a beam pattern such that the light for a beam pattern to be changed into recognizable light and allow the light for a beam pattern to exit to the outside of the vehicle.

Here, the lidar-integrated lamp device may further include: a light receiving unit 60 configured to receive light for lidar sensing returned upon being reflected from an object after exiting to the outside of the vehicle and to convert the received light into an electrical signal.

The lidar-integrated lamp device may further include: a first optical system 80 allowing the light for lidar sensing reflected from the first reflective mirror 40 to be spread and exit to the outside of the vehicle. Also, the lidar-integrated lamp device may further include: a second optical system 90 allowing the light for a beam pattern changed into recognizable light by the second reflective mirror 50 to be incident thereon and allowing the light for a beam pattern to be projected to the outside of the vehicle.

As described above, the present invention includes the light source 10 for a beam pattern, the light source 20 for lidar sensing, the reflective unit 30, the first reflective mirror 40, and the second reflective mirror 50, and each component is provided in a single installation space to thereby realize both a headlamp and a lidar function. That is, the light for a beam pattern irradiated from the light source 10 for a beam pattern is changed in a movement path by the reflective unit 30, the second reflective mirror 50, and the second optical system 90 to be output to the outside of the vehicle, and the light for lidar sensing irradiated from the light source 20 for lidar sensing is changed in a movement path by the reflective unit 30, the first reflective mirror 40 and the first optical system 80 to exit to the outside of the vehicle, and a distance between the vehicle and the object may be checked through the light for lidar sensing which is returned after being reflected from the object and input to the light receiving unit 60.

To the present end, the light source 10 for a beam pattern irradiates a laser beam, and since a laser wavelength band is a visible light wavelength band recognizable by naked eyes, and thus, the light for a beam pattern may be projected onto a road surface of the vehicle, and the light source 20 for lidar sensing irradiates infrared ray having a laser wavelength of 905 nm, so that the light for lidar sensing for detecting the host vehicle and an object is irradiated.

The light for a beam pattern and the light for lidar sensing emitted from the light source 10 for a beam pattern and the light source 20 for lidar sensing, respectively, are incident on the reflective unit 30. Here, the reflective unit 30 includes a reflective mirror 31 which is changed 360 degrees about a rotation axis when a driving signal is applied to the reflective mirror, to be changed in a rotation angle. Thus, an irradiation angle of the light for a beam pattern and an irradiation angle of the light for lidar sensing may be changed depending on a rotation angle of the reflective mirror 31. That is, the reflective unit 30 includes the reflective mirror 31 for reflecting light, the reflective mirror 31 may be configured as a mirror which is configured to be rotated 360 degrees to change a movement path of the light for a beam pattern and the light for lidar sensing to change an irradiation angle of light. Here, since the reflective unit 30 is provided between the light source 10 for a beam pattern and the light source 20 for lidar sensing, the light for a beam pattern and the light for lidar sensing are incident from different paths, and the light for a beam pattern reflected from the reflective mirror 31 and the light for lidar sensing are changed in a movement path in the mutually opposite direction in which they do not overlap each other. In the case of the reflective unit 30, a case 32 in which the reflective mirror 31 is disposed may be configured to be tilted so as not to be interfered with a movement path of light, and may be disposed at an upper or lower end portion of the reflective mirror 31.

In an exemplary embodiment of the present invention, an actuator is connected to the reflective mirror 31 which is changed 360 degrees about a rotation axis when a driving signal is input to the actuator.

In the present manner, the light for a beam pattern reflected through the reflective unit 30 is changed in the movement direction by the second reflective mirror 50 and exits to the outside of the vehicle, and the light for lidar sensing is changed in a movement direction by the first reflective mirror 40 to exit to outside of the vehicle.

Here, the light for a beam pattern of the light source 10 for a beam pattern may be changed into recognizable light through the second reflective mirror 50 to illuminate the road surface and may be projected to the outside of the vehicle through the second optical system 90. Furthermore, a diffusion unit 35 for diffusing light for a beam pattern is provided between the reflective unit 30 and the second reflective mirror 50, so that light for a beam pattern may be projected smoothly on the road surface. That is, the light for a beam pattern emitted from the light source 10 for a beam pattern is diffused in a horizontal direction according to a change in a rotation angle of the reflective mirror 31 provided in the reflective unit 30, is diffused in a vertical direction by a vertical length of the second reflective mirror 50 by the diffusion unit 35, and is changed into a specific color by the second reflective mirror 50, and thereafter, a beam pattern is formed through the second optical system 90 and projected to the outside of the vehicle.

Here, the second reflective mirror 50 may be formed of a phosphor, and a heat dissipation plate 52 may be attached to the second reflective mirror 50 to dissipate heat generated by the light for a beam pattern. Here, the light for a beam pattern of the light source 10 for a beam pattern may be configured to irradiate a blue laser to be changed into white light when reflected from the second reflective mirror 50 formed of the phosphor.

Also, as illustrated in FIG. 4, the second reflective mirror 50 includes a plurality of opaque partitions 51 extending in a straight line on an end surface of the second reflective mirror 50 and spaced from each other, and thus, the light for a beam pattern reflected by the second reflective mirror 50 is limited in blur due to the structure of the opaque partitions 51 and a desired beam pattern may be formed.

Meanwhile, the light for lidar sensing from the light source 20 for lidar sensing are moved forward of the vehicle through the first reflective mirror 40 and reflected by an object ahead of the vehicle to be returned. The light for lidar sensing, which is returned upon being reflected from the object, is received by a light receiving unit 60 and converted into an electric signal to thereby measure a distance between the vehicle and the object. The light receiving unit 60 may be configured as a scanner for recognizing the light for lidar sensing, and the light for lidar sensing may be detected through a photodiode and converted into an electric signal.

As described above, according to an exemplary embodiment of the present invention, since the lidar is configured together in the headlamp mounting space, a separate space for providing the lidar is reduced and cost is reduced as the number of components is reduced.

Since the light source 10 for a beam pattern and the light source 20 for lidar sensing are disposed upwards and downwards, the first reflective mirror 40, the first optical system 80, the second reflective mirror 50, and the second optical system 90 may be disposed to be opposite to each other in an up-and-down direction thereof, and it will be apparent to those skilled in the art that various modifications and changes may be made in the exemplary embodiments described below.

Meanwhile, the present invention may further include a controller 70 configured to control ON/OFF of the reflective mirror 31, the light source 10 for a beam pattern, and the light source 20 for lidar sensing. Here, the controller 70 may be realized through a processor configured to perform an operation described hereinafter using a nonvolatile memory configured to store an algorithm configured to control operations of various components of the vehicle or data regarding a software command for reproducing the algorithm and the data stored in the corresponding memory. Here, the memory and the processor may be realized as individual chips. Alternatively, the memory and the processor may be realized as an integrated single chip. The processor may be one or more processors.

A lamp irradiation angle region and a lidar irradiation angle region based on the rotation angles of the reflective mirror 31 may be set in advance in the controller 70, and the controller 70 may turn on the light source 10 for a beam pattern when the rotation angle of the reflective mirror 31 corresponds to the lamp irradiation angle region, and may turn on the light source 20 for lidar sensing when a rotation angle of the reflective mirror 31 corresponds to the lidar irradiation angle region.

That is, the reflective mirror 31 of the reflective unit 30 is rotated 360 degrees, and since the lamp irradiation angle region and the lidar irradiation angle region based on the rotation angles of the reflective mirror 31 are set in advance in the controller 70, the controller 70 may cause the light for a beam pattern and the light for lidar sensing to be irradiated by a desired irradiation angle by controlling ON/OFF of the light source 10 or a beam pattern and the light source 20 for lidar sensing.

Figure 5:
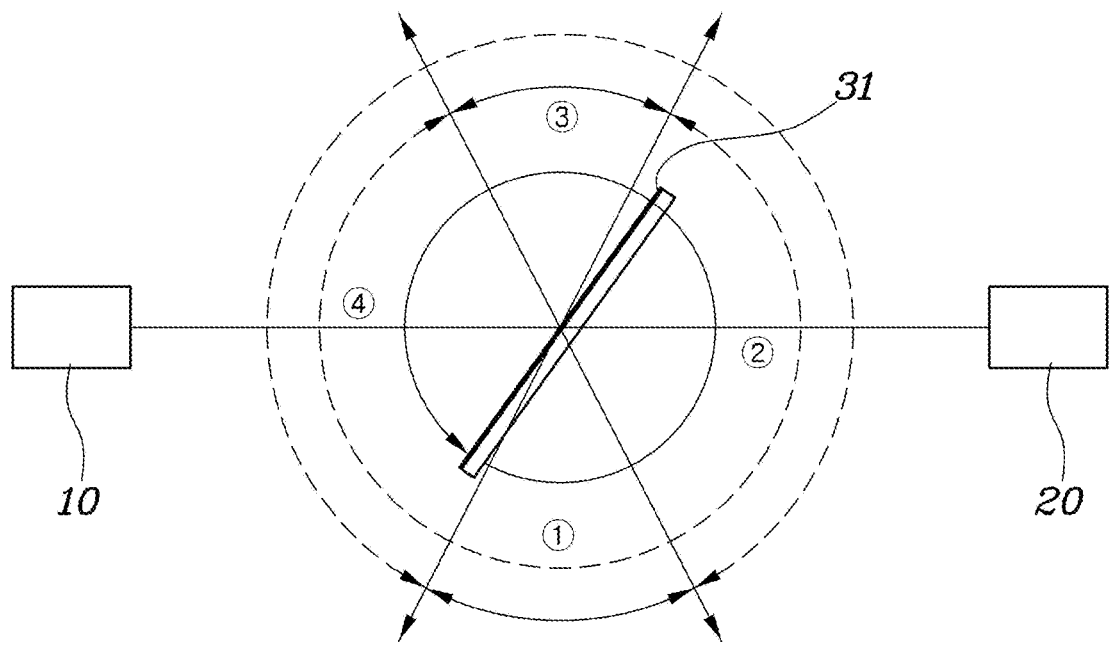
FIG. 5, FIG. 6 and FIG. 7 are views illustrating controlling of a light source of a lidar-integrated lamp device for a vehicle according to an exemplary embodiment of the present invention.

For example, as illustrated in FIG. 5, on the assumption that a lamp irradiation angle region is ① and a lidar irradiation angle region is ③ in a light reflection region according to a rotation angle of the reflective mirror 31, the light source 10 for a beam pattern is turned on when an irradiation angle of the light for a beam pattern based on a rotation angle of the reflective mirror 31 enters the region ① based on the predetermined lamp irradiation angle region, the light source 20 for lidar sensing is turned on when an irradiation angle of the light for lidar sensing based on a rotation angle of the reflective mirror 31 enters the region ③ based on the predetermined lidar irradiation angle region, and the light source 10 for a beam pattern and the light source 20 for lidar sensing are turned off when the irradiation angle of the light for a beam pattern and the irradiation angle of the light for lidar sensing based on the rotation angle of the reflective mirror 31 enters regions ② and ④. Accordingly, a movement path of the light for a beam pattern and the light for lidar sensing, when reflected by the reflective mirror 31, may be determined to be limited to a specific region, and the light may be moved at the corresponding irradiation angle.

The lamp irradiation angle region and the lidar irradiation angle region may be set variously, and as illustrated in FIG. 6, the lidar irradiation angle region may be secured to be larger to thereby omit a separate lens for horizontal angle diffusion. Furthermore, as illustrated in FIG. 7, the lidar irradiation angle region may be laterally enlarged to increase a detecting range of the lidar to the side including the front, whereby an object around the vehicle may be smoothly detected.

Meanwhile, when a dark portion to which the light for a beam pattern is not irradiated is generated in the lamp irradiation angle region, the controller 70 may set a dark portion generation angle corresponding to the dark portion and turn off the light source 10 for a beam pattern at the dark portion generation angle. That is, in a case of forming a dark portion with respect to an oncoming vehicle ahead of the host vehicle, the controller 70 may set a dark portion generation angle corresponding to the dark portion and turn off the light source 10 for a beam pattern at the dark portion generation angle, thus forming a dark portion.

Meanwhile, as illustrated in FIG. 1, the reflective mirror 31 of the reflective unit 30 is tilted to cause the light for a beam pattern and the light for lidar sensing to be moved upward or downward, and the first reflective mirror 40 and the second reflective mirror 50 may be spaced from each other upwards and downwards with respect to the reflective unit 30 according to a tilting direction of the reflective mirror 31.

Thus, since the reflective unit 30 is provided to be tilted, a movement path of the light for a beam pattern and the light for lidar sensing may be moved upward or downward according to the rotation angle of the reflective mirror 31. In an exemplary embodiment of the present invention, as illustrated in FIG. 1, as the reflector 31 is provided to be tilted, the light for a beam pattern reflected from the reflective unit 30 may be moved downwards and the light for lidar sensing reflected from the reflective unit 30 may be moved upward. Accordingly, the second reflective mirror 50 and the second optical system 90 may be disposed below the reflective unit 30 and the first reflective mirror 40 and the first optical system 80 may be disposed above the reflective unit 30.

Due to the provided configuration, the light for a beam pattern of the light source 10 for a beam pattern and the light for lidar sensing of the light source 20 for lidar sensing are moved to different paths by the reflective unit 30, and the light overlap may be avoided.

In detail, as illustrated in FIGS. 1 and 3, a rotation axis al of the reflective mirror 31 is tilted at an installation angle θ in a virtual vertical line a passing through the reflective mirror 31, the first reflective mirror 40 is provided on one side of the reflective unit 30, and the second reflective mirror 50 is provided on the other side of the reflective unit 30, whereby the light for a beam pattern is reflected from the reflective mirror 31 and moved to one side to exit to the outside of the vehicle by the first reflective mirror 40, and the light for lidar sensing is reflected from the reflective mirror 31, moved to the other side, and changed in a movement direction to one side by the second reflective mirror 50 to exit to the outside of the vehicle.

In an exemplary embodiment of the present invention, the reflective unit 30 is provided to be tilted and the light source 10 for a beam pattern and the light source 20 for lidar sensing disposed symmetrically with respect to the reflective unit 30 are configured to irradiate light toward the reflective mirror 31, whereby the light for a beam pattern and the light for lidar sensing are moved upward or downward in different directions according to a rotation angle of the reflective mirror 31.

That is, since the first reflective mirror 40 is provided on one side of the reflective unit 30 above the reflective unit 30 and the second reflective mirror 50 is provided on the other side of the reflective unit 30 below the reflective unit 30, the light for lidar sensing reflected from the reflective mirror 31 of the reflective unit 30 is moved to one side and exits to the outside of the vehicle through the first reflective mirror 40 and the light for a beam pattern reflected by the reflective mirror 31 of the reflective unit 30 is moved to the other side, reflected from the second reflective mirror 50, and changed in a movement direction to one side, and exits to the outside of the vehicle through the second optical system 90.

Meanwhile, as illustrated in FIG. 3, the first reflective mirror 40 may be spaced from the reflective mirror 31 at a right angle to the rotation axis al of the reflective mirror 31 and a vertical line b of the first reflective mirror 40 may be tilted by ½ of the installation angle θ with respect to the vertical line a passing through the reflective mirror 31.

Thus, since the first reflective mirror 40 is spaced from the reflective mirror 31 at a right angle on the rotation axis of the reflective mirror 31, the first reflective mirror 40 may be disposed at a position to which the light for lidar sensing irradiated from the light source 20 for lidar sensing is moved after being reflected from the reflective mirror 31. Furthermore, since the reflective mirror 31 is disposed to be tilted at the installation angle θ, the first reflective mirror 40 is provided such that the vertical line b of the first reflective mirror 40 is tilted by ½ of the installation angle θ with respect to the vertical line a passing through the reflective mirror 31, when the light for lidar sensing moved after being reflected from the reflective unit 30 is reflected from the first reflective mirror 40, the light is changed in direction to a horizontal direction and an optical axis of the light for lidar sensing may pass through the first optical system 80 and may be moved toward the outside of the vehicle.

Meanwhile, as illustrated in FIG. 3, the second reflective mirror 50 is spaced from the reflective mirror 31 at a right angle to the rotation axis a1 of the reflective mirror 31, and a vertical line c of the second reflective mirror 50 may be provided to be tilted by ½ of the installation angle θ.

Here, the second reflective mirror 50 may be positioned on the opposite side of the first reflective mirror 40 with respect to the reflective unit 30 and may be spaced from the reflective mirror 31 at a right angle to the rotation axis a1 of the reflective mirror 31 so that the second reflective mirror 50 may be disposed at a position to which the light for a beam pattern irradiated from the light source 10 for a beam pattern is moved after being reflected from the reflective mirror 31. Furthermore, as the reflective mirror 31 is tilted at the installation angle θ, the second reflective mirror 50 is provided so that the vertical line c of the second reflective mirror 50 is tilted by ½ of the installation angle θ, and accordingly, when the light for a beam pattern moved after being reflected from the reflective unit 30 is reflected by the second reflective mirror 50, the light for a beam pattern is changed in direction to the horizontal direction so that the optical axis of the light for a beam pattern may be moved toward the outside of the vehicle through the second optical system 90.

The first optical system 80 may include a first diffusion lens 81 diffusing the light for lidar sensing moved after being reflected from the first reflective mirror 40 in the horizontal direction and a second diffusion lens 82 diffusing the light for lidar sensing, diffused by the first diffusion lens 81 in the horizontal direction thereof, in a vertical direction thereof.

Here, the first diffusion lens 81 may be configured as a concave lens and may diffuse the light for lidar sensing expanded by the reflective unit 30 in the horizontal direction more widely. Also, the second diffusion lens 82 may be configured as a convex lens. The light for lidar sensing diffused in the horizontal direction by the first diffusion lens 81 may be diffused in the vertical direction thereof, whereby the light for lidar sensing may be diffused widely to the outside of the vehicle so that an object may be clearly detected.

In a lidar-integrated lamp device for a vehicle according to various exemplary embodiments of the present invention, as illustrated in FIGS. 8 to 9, a condenser lens 37 is provided between the reflective unit 30 and the diffusion unit 35. The light for a beam pattern irradiated from the light source 10 for a beam pattern is expanded by the reflective unit 30 in a horizontal direction, additionally expanded by the condenser lens 37 in the horizontal direction, and subsequently expanded by the diffusion unit 35 in a vertical direction, whereby the light for a beam pattern may be matched to an area of the reflective mirror 31 of the reflective unit 30. Furthermore, the first optical system 80 may include only the diffusion lens causing the light for lidar sensing to be diffused in the vertical direction, thus simplifying a structure.

In the lidar-integrated lamp device for a vehicle having the above-described structure, the application position of the headlamp and the application position of the lidar are the same to reduce the layout and cost according to a reduction in the number of components through the component sharing combination.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A laser radar, light detection and ranging (LIDAR)-integrated lamp device for a vehicle, the LIDAR-integrated lamp device comprising:
   a first light source for a beam pattern and a second light source for LIDAR sensing, wherein the first light source and the second light source are disposed to face each other and configured to light for the beam pattern and light for LIDAR sensing in a direction opposite to each other;
   a reflection unit provided between the first light source for the beam pattern and the second light source for LIDAR sensing and configured to change traveling paths of the light for the beam pattern and the light for LIDAR sensing incident in different directions such that the light for the beam pattern and the light for LIDAR sensing travel in first and second directions opposite to each other, respectively;
   a first reflection mirror provided on a first side of the reflection unit to allow the light for LIDAR sensing reflected from the reflection unit to be incident thereon and configured to allow the light for LIDAR sensing to exit to the outside of the vehicle; and
   a second reflection mirror provided on a second side of the reflection unit to allow the light for the beam pattern reflected from the reflection unit to be incident thereon and configured to reflect the light for the beam pattern such that the light for the beam pattern is changed into recognizable light and to allow the light for the beam pattern to exit to the outside of the vehicle.

2. The LIDAR-integrated lamp device of claim 1, further including:
   a light receiving unit configured to receive light for LIDAR sensing returned upon being reflected from an object after exiting to the outside of the vehicle and to convert the received light into an electrical signal.

3. The LIDAR-integrated lamp device of claim 1, wherein the reflection unit includes:
   a reflective mirror which is configured to be rotated 360 degrees about a rotation axis of the reflective mirror to be changed in a rotation angle of the reflective mirror when a driving signal is applied to the reflective mirror, and an irradiation angle of the light for the beam pattern and an irradiation angle of the light for LIDAR sensing are changed according to rotation angles of the reflective mirror.

4. The LIDAR-integrated lamp device of claim 3, further including:
a controller connected to an actuator of the reflective mirror, the first light source and the second light source and configured to selectively control operation of the reflective mirror, the first light source for the beam pattern, and the second light source for LIDAR sensing,
wherein a lamp irradiation angle region and a LIDAR irradiation angle region based on the rotation angles of the reflective mirror are set in advance in the controller, and
wherein the controller turns on the first light source for the beam pattern when the rotation angle of the reflective mirror corresponds to the lamp irradiation angle region, and turns on the second light source for LIDAR sensing when the rotation angle of the reflective mirror corresponds to the LIDAR irradiation angle region.

5. The LIDAR-integrated lamp device of claim 4,
wherein when a dark portion to which the light for the beam pattern is not irradiated is generated in the lamp irradiation angle region, the controller is configured to set a dark portion generation angle corresponding to the dark portion and turns off the first light source for the beam pattern at the dark portion generation angle.

6. The LIDAR-integrated lamp device of claim 3,
wherein the reflective mirror of the reflection unit is tilted to cause the light for the beam pattern and the light for LIDAR sensing to be moved upward or downward, and
wherein the first reflection mirror and the second reflection mirror are spaced from each other upwards and downwards with respect to the reflection unit according to a tilting direction of the reflective mirror.

7. The LIDAR-integrated lamp device of claim 3,
wherein a rotation axis of the reflective mirror is tilted at an installation angle in a virtual vertical line passing through the reflective mirror, the first reflection mirror is provided on the first side of the reflection unit, and the second reflection mirror is provided on the second side of the reflection unit, whereby the light for the beam pattern is reflected from the reflective mirror and moved to the first side to exit to the outside of the vehicle by the second reflection mirror, and the light for LIDAR sensing is reflected from the reflective mirror, moved to the second side of the reflective mirror, and changed in a movement direction to the first side by the first reflection mirror to exit to the outside of the vehicle.

8. The LIDAR-integrated lamp device of claim 7,
wherein the second reflection mirror is spaced from the reflective mirror at a right angle to the rotation axis of the reflective mirror and a vertical line of the first reflection mirror is tilted by half of the installation angle with respect to the vertical line passing through the reflective mirror.

9. The LIDAR-integrated lamp device of claim 7,
wherein the second reflection mirror is spaced from the reflective mirror at a right angle to the rotation axis of the reflective mirror and a vertical line of the second reflection mirror is tilted by half of the installation angle.

10. The LIDAR-integrated lamp device of claim 9, wherein the second reflection mirror is formed of a phosphor.

11. The LIDAR-integrated lamp device of claim 9, wherein a heat dissipation plate is attached to the second reflection mirror to dissipate heat.

12. The LIDAR-integrated lamp device of claim 1, further including:
a first optical system allowing the light for LIDAR sensing reflected from the second reflection mirror to be diffused and exit to the outside of the vehicle.

13. The LIDAR-integrated lamp device of claim 12, wherein the first optical system includes:
a first diffusion lens diffusing the light for LIDAR sensing moved after being reflected from the first reflection mirror in a horizontal direction; and
a second diffusion lens diffusing the light for LIDAR sensing, diffused by the first diffusion lens in the horizontal direction, in a vertical direction.

14. The LIDAR-integrated lamp device of claim 13, wherein the first diffusion lens is a concave lens and the second diffusion lens is a convex lens.

15. The LIDAR-integrated lamp device of claim 1, further including:
a second optical system allowing the light for the beam pattern changed into recognizable light by the second reflection mirror to be incident and allowing the light for the beam pattern to be projected to the outside of the vehicle.

16. The LIDAR-integrated lamp device of claim 1,
wherein a diffusion unit configured to diffuse the light for the beam pattern is provided between the reflective unit and the second reflection mirror.

17. The LIDAR-integrated lamp device of claim 1,
wherein a plurality of opaque partitions extending in a straight line are spaced from each other on a surface of the second reflection mirror.

* * * * *